United States Patent
Han et al.

(10) Patent No.: US 8,044,138 B2
(45) Date of Patent: Oct. 25, 2011

(54) CARBOXYLIC ACID-MODIFIED NITRILE COPOLYMER LATEX AND LATEX COMPOSITION FOR DIP FORMING COMPRISING THE SAME

(75) Inventors: Jung Su Han, Daejeon (KR); Byoung Yun Kim, Seoul (KR); Ho Yeul Choi, Daejeon (KR); Chang Sun Han, Daejeon (KR); Seung Hun Yang, Daejeon (KR); Jung Eun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/634,027

(22) Filed: Dec. 9, 2009

(65) Prior Publication Data

US 2010/0152365 A1    Jun. 17, 2010

(30) Foreign Application Priority Data

Dec. 16, 2008    (KR) ........................ 10-2008-0128003

(51) Int. Cl.
*C08L 55/00* (2006.01)
*C08L 33/18* (2006.01)
*C08L 33/02* (2006.01)
*C08L 35/04* (2006.01)

(52) U.S. Cl. ..... 524/571; 524/556; 524/565; 526/317.1; 526/318.45; 526/319; 526/329.1; 526/329.3; 526/335; 526/341

(58) Field of Classification Search ................ 524/556, 524/565, 571; 526/318.45, 329.1, 329.3
See application file for complete search history.

(56) References Cited

U.S. PATENT DOCUMENTS 7,273,906 B2 * 9/2007 Ota et al. ...................... 524/571
7,345,111 B2   3/2008 Ozawa et al.

FOREIGN PATENT DOCUMENTS

| CN | 1358808 A | 7/2002 |
|---|---|---|
| JP | 2006-321955 A | 11/2006 |
| JP | 03-900530 B2 | 4/2007 |
| TW | 200626622 A | 8/2006 |

OTHER PUBLICATIONS

Machine translation of JP 05/255,457 (published Oct. 5, 1993).*
English-language abstract of JP 05/255,457 (Oct. 5, 1993).*
Chinese Office Action issued on Jun. 21, 2011 in connection with corresponding Chinese Appln. No. 200910211972.4.

* cited by examiner

*Primary Examiner* — David W Wu
*Assistant Examiner* — Vu A Nguyen
(74) *Attorney, Agent, or Firm* — Lerner, David, Littenberg, Krumholz & Mentlik, LLP

(57) ABSTRACT

A carboxylic acid-modified nitrile copolymer latex is provided. The copolymer latex comprises a carboxylic acid-modified nitrile copolymer of an unsaturated monomer having at least one crosslinkable functional group selected from vinyl and epoxy groups. The use of the copolymer latex enables the production of a molded article that does not undergo long stirring and maturation, causes no allergic reactions due to the absence of sulfur and a vulcanization accelerator, has good oil resistance and high mechanical strength, and produces a soft feeling. Further provided is a latex composition for dip forming comprising the copolymer latex, and an article produced from the latex composition by dip forming.

13 Claims, No Drawings

CARBOXYLIC ACID-MODIFIED NITRILE COPOLYMER LATEX AND LATEX COMPOSITION FOR DIP FORMING COMPRISING THE SAME

CROSS-REFERENCE TO RELATED APPLICATION

This application claims priority from Korean Patent Application No. 10-2008-0128003 filed on Dec. 16, 2008, in the Korean Intellectual Property Office, the disclosure of which is incorporated herein by reference in its entirety.

BACKGROUND OF THE INVENTION

1. Field of the Invention

The present invention relates to a carboxylic acid-modified nitrile copolymer latex (hereinafter also referred to as a 'copolymer latex') for the production of a molded article that does not undergo long stirring and maturation, causes no allergic reactions due to the absence of sulfur and a vulcanization accelerator, has good oil resistance and high mechanical strength, and produces a soft feeling. The present invention also relates to a latex composition for dip forming comprising the copolymer latex, and an article produced from the latex composition by dip forming.

2. Description of the Related Art

Rubber gloves are currently used in a variety of applications, including food, electronic and medical industries, as well as household applications. Most rubber gloves have been produced from natural rubber latexes by dip forming. However, proteins contained in natural rubber cause allergic reactions such as pain and rash in some sensitive users.

Under such circumstances, many efforts have been made to produce gloves from synthetic rubber latexes that cause no allergic reactions. For example, gloves are produced by blending a carboxylic acid-modified nitrile copolymer latex (e.g., an acrylic acid-acrylonitrile-butadiene copolymer latex), sulfur and a vulcanization accelerator to prepare a latex composition, and dip forming the latex composition.

However, the latex composition should undergo stirring and maturation for a long time, typically at least 24 hours. This long stirring and maturation results in low productivity of the gloves.

Further, when a wearer of rubber gloves produced from a composition essentially comprising sulfur and a vulcanization accelerator works for a long period of time, he/she may experience allergic reactions such as skin irritation. Further, the sulfur produces an offensive smell, making him/her unpleasant, and the gloves tend to discolor over time, resulting in loss of their commercial value.

Japanese Unexamined Patent Publication No. 2006-321955 discloses a latex composition for dip forming comprising a conjugated diene rubber latex and an organic peroxide without using sulfur and a vulcanization accelerator, and an article produced from the latex composition by dip forming. The use of the latex composition eliminates the need for long stirring and maturation in the production of the dip-formed article. Further, the dip-formed article undergoes no discoloration even after long-term use. However, a solution of the organic peroxide is harmful to humans and poses a danger of fire or exploration when heat or impact is applied thereto.

U.S. Pat. No. 7,345,111 discloses a glove that is produced using an acrylic emulsion latex and a monomer crosslinkable with the acrylic emulsion latex without the need for long stirring and maturation. The acrylic glove causes no allergic reactions due to the absence of sulfur and a vulcanization accelerator, but it has the problem of high sensitivity to temperature.

SUMMARY OF THE INVENTION

The present invention has been made in an effort to solve the problems of the prior art, and it is an object of the present invention to provide a carboxylic acid-modified nitrile copolymer latex for the production of a molded article that does not undergo long stirring and maturation, causes no allergic reactions due to the absence of sulfur and a vulcanization accelerator, has good oil resistance and high mechanical strength, and produces a soft feeling.

It is another object of the present invention to provide a latex composition for dip forming comprising the copolymer latex.

It is still another object of the present invention to provide an article produced from the latex composition by dip forming.

According to an aspect of the present invention, there is provided a carboxylic acid-modified nitrile copolymer latex which comprises a carboxylic acid-modified nitrile copolymer of an unsaturated monomer having at least one crosslinkable functional group.

According to another aspect of the present invention, there is provided a latex composition for dip forming which comprises the carboxylic acid-modified nitrile copolymer latex and one or more additives selected from the group consisting of ionic cross-linking agent, pigments, fillers, thickeners and pH-adjusting agents.

According to yet another aspect of the present invention, there is provided an article that is produced from the latex composition by dip forming.

DETAILED DESCRIPTION OF THE INVENTION

Exemplary embodiments of the present invention will now be described in greater detail.

1. Carboxylic Acid-Modified Nitrile Copolymer Latex

The copolymer latex of the present invention is prepared by adding an emulsifier, a polymerization initiator, a molecular weight modifier and one or more other additives to constituent monomers of a carboxylic acid-modified nitrile copolymer, followed by emulsion polymerization.

The copolymer latex of the present invention will be described in detail below.

The carboxylic acid-modified nitrile copolymer is prepared from, as constituent monomers, a conjugated diene monomer, an ethylenically unsaturated nitrile monomer, an ethylenically unsaturated acid monomer, and an unsaturated monomer having at least one crosslinkable functional group selected from vinyl or epoxy groups (hereinafter also referred to as a 'crosslinkable unsaturated monomer').

The copolymer latex of the present invention features the use of the crosslinkable unsaturated monomer in the preparation of carboxylic acid-modified nitrile copolymer.

The use of the crosslinkable unsaturated monomer enables the production of an article by dip forming while eliminating the need to use sulfur and a vulcanization accelerator as reactive components that are commonly used in the art.

Specifically, the crosslinkable unsaturated monomer is selected from the group consisting of glycidyl (meth)acrylate, α-methylglycidyl (meth)acrylate, allyl glycidyl ether, oxocyclohexyl (meth)acrylate, 3,4-epoxycyclohexylmethyl (meth)acrylate, ethyleneglycol dimethacrylate, diethyleneglycol dimethacrylate, triethyleneglycol dimethacrylate, 1,3- butanediol dimethacrylate, 1,6-hexanediol dimethacrylate, 2,5-hexanediol dimethacrylate, 2,4-pentanediol diacrylate, 2,4-pentanediol dimethacrylate, dipropyleneglycol diacrylate, trimethylolpropane triacrylate, trimethylolpropane trimethacrylate, neopentylglycol diacrylate, neopentylglycol dimethacrylate, and mixtures thereof.

The crosslinkable unsaturated monomer is used in an amount of 0.1 to 5% by weight and preferably 0.3 to 3% by weight, based on the weight of all constituent monomers of the carboxylic acid-modified nitrile copolymer. The use of the crosslinkable unsaturated monomer in an amount of less than 0.1% by weight deteriorates the oil resistance and tensile strength of a final dip-formed article. Meanwhile, the use of the crosslinkable unsaturated monomer in an amount of more than 5% by weight causes a rough feeling and poor wearability of a final dip-formed article.

Specifically, the conjugated diene monomer is selected from the group consisting of 1,3-butadiene, 2,3-dimethyl-1,3-butadiene, 2-ethyl-1,3-butadiene, 1,3-pentadiene, isoprene, and mixtures thereof. 1,3-butadiene and isoprene are preferred. 1,3-butadiene is most preferred.

The conjugated diene monomer is used in an amount of 40 to 90% by weight, preferably 45 to 80% by weight, and most preferably 50 to 78% by weight, based on the weight of all constituent monomers of the carboxylic acid-modified nitrile copolymer. The use of the conjugated diene monomer in an amount of less than 40% by weight makes a final dip-formed article hard and less wearable. Meanwhile, the use of the conjugated diene monomer in an amount of more than 90% by weight deteriorates the oil resistance and tensile strength of a final dip-formed article.

The ethylenically unsaturated nitrile monomer is selected from the group consisting of acrylonitrile, methacrylonitrile, fumaronitrile, α-chloronitrile, α-cyanoethylacrylonitrile, and mixtures thereof. Acrylonitrile and methacrylonitrile are preferred. Acrylonitrile is most preferred.

The ethylenically unsaturated nitrile monomer is used in an amount of 10 to 50% by weight, preferably 15 to 45% by weight and most preferably 20 to 40% by weight, based on the weight of all constituent monomers of the carboxylic acid-modified nitrile copolymer. The use of the ethylenically unsaturated nitrile monomer in an amount of less than 10% by weight deteriorates the oil resistance and tensile strength of a final dip-formed article. Meanwhile, the use of the ethylenically unsaturated nitrile monomer in an amount of more than 50% by weight makes a final dip-formed article hard and less wearable.

The ethylenically unsaturated acid monomer has at least one acid group selected from the group consisting of carboxyl, sulfonic acid and acid anhydride groups. Examples of the ethylenically unsaturated acid monomer include: ethylenically unsaturated carboxylic acid monomers, such as acrylic acid, methacrylic acid, itaconic acid, maleic acid and fumaric acid; polycarboxylic acid anhydrides, such as maleic anhydride and citraconic anhydride; ethylenically unsaturated sulfonic acid monomers, such as styrenesulfonic acid; and partial ester monomers of ethylenically unsaturated polycarboxylic acids, such as monobutyl fumarate, monobutyl maleate and mono-2-hydroxypropyl maleate. Methacrylic acid is particularly preferred. The ethylenically unsaturated acid monomer may be used in the form of an alkali metal salt or an ammonium salt.

The ethylenically unsaturated acid monomer is used in an amount of 0.1 to 10% by weight, preferably 0.5 to 9% by weight and more preferably 1 to 8% by weight, based on the weight of all constituent monomers of the carboxylic acid-modified nitrile copolymer. The use of the ethylenically unsaturated acid monomer in an amount of less than 0.1% deteriorates the tensile strength of a final dip-formed article. Meanwhile, the use of the ethylenically unsaturated acid monomer in an amount of more than 10% by weight makes a final dip-formed article hard and less wearable.

An ethylenically unsaturated monomer copolymerizable with the ethylenically unsaturated nitrile monomer and the ethylenically unsaturated acid monomer may be optionally added in the preparation of the carboxylic acid-modified nitrile copolymer by polymerization. Specifically, the copolymerizable ethylenically unsaturated monomer is selected from the group consisting of: vinyl aromatic monomers, such as styrene, alkylstyrenes and vinyl naphthalene; fluoroalkyl vinyl ethers, such as fluoroethyl vinyl ether; ethylenically unsaturated amide monomers, such as (meth)acrylamide, N-methylol(meth)acrylamide, N,N-dimethylol(meth)acrylamide, N-methoxymethyl(meth)acrylamide and N-propoxymethyl(meth)acrylamide; non-conjugated diene monomers, such as vinyl pyridine, vinyl norbornene, dicyclopentadiene and 1,4-hexadiene; ethylenically unsaturated carboxylic acid ester monomers, such as methyl (meth)acrylate, ethyl (meth)acrylate, butyl (meth)acrylate, 2-ethylhexyl(meth)acrylate, trifluoroethyl (meth)acrylate, tetrafluoropropyl acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl(meth)acrylate, 1-cyanopropyl (meth)acrylate, 2-ethyl-6-cyanohexyl(meth)acrylate, 3-cyanopropyl(meth)acrylate, hydroxymethyl (meth)acrylate, hydroxyethyl (meth)acrylate, hydroxypropyl (meth)acrylate, glycidyl (meth)acrylate and dimethylaminoethyl (meth)acrylate; and mixtures thereof.

The copolymerizable ethylenically unsaturated monomer may be used in an amount not larger than 20% by weight, based on the weight of all constituent monomers of the carboxylic acid-modified nitrile copolymer. The use of the copolymerizable ethylenically unsaturated monomer in an amount exceeding 20% by weight causes an imbalance between soft wearability and tensile strength of a final dip-formed article.

The copolymer latex of the present invention can be prepared by adding an emulsifier, a polymerization initiator, a molecular weight modifier and one or more other additives to the constituent monomers of the carboxylic acid-modified nitrile copolymer, followed by emulsion polymerization.

Examples of the emulsifier include, but are not particularly limited to, anionic surfactants, anionic surfactants, cationic surfactants and amphoteric surfactants. The surfactant is particularly preferably an anionic surfactant selected from the group consisting of alkylbenzene sulfonic acid salts, aliphatic sulfonic acid salts, sulfuric acid salts of higher alcohols, α-olefin sulfonic acid salts, and alkyl ether sulfuric acid ester salts. The emulsifier is preferably used in an amount of 0.3 to 10 parts by weight, more preferably 0.8 to 8 parts by weight, and more preferably 1.5 to 6 parts by weight, based on 100 parts by weight of all constituent monomers of the carboxylic acid-modified nitrile copolymer.

The kind of the polymerization initiator is not particularly limited. The polymerization initiator is preferably a radical initiator. The radical initiator is selected from the group consisting of: inorganic peroxides, such as sodium persulfate, potassium persulfate, ammonium persulfate, potassium perphosphate and hydrogen peroxide; organic peroxides, such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile; azo compounds, such as azobis-2,4-dimethylvaleronitrile; azobiscyclohexane carbonitrile; methyl azobisisobutyrate; and mixtures thereof. Inorganic peroxides are more preferred. A persulfate salt is particularly preferred. The polymerization initiator is preferably used in an amount of 0.01 to 2 parts by weight, more preferably 0.02 to 1.5 parts by weight and most preferably 0.5 to 1 part by weight, based on 100 parts by weight of all constituent monomers of the carboxylic acid-modified nitrile copolymer.

Examples of the molecular weight modifier include, but are not particularly limited to: α-methylstyrene dimers; mercaptans, such as t-dodecyl mercaptan, n-dodecyl mercaptan and octyl mercaptan; halogenated hydrocarbons, such as carbon tetrachloride, methylene chloride and methylene bromide; and sulfur-containing compounds, such as tetraethylthiuram disulfide, dipentamethylenethiuram disulfide and diisopropylxanthogene disulfide. These molecular weight modifiers may be used alone or in combination with two or more thereof. Of these, mercaptans are preferred. T-dodecyl mercaptan is more preferred. The amount of the molecular weight modifier used may vary depending on the kind of the molecular weight modifier. The molecular weight modifier is preferably used in an amount of 0.1 to 0.9 parts by weight, more preferably 0.2 to 0.7 parts by weight and most preferably 0.3 to 0.6 parts by weight, based on 100 parts by weight of all constituent monomers of the carboxylic acid-modified nitrile copolymer.

It should be appreciated that, if necessary, one or more additives selected from chelating agents, dispersants, pH-adjusting agents, oxygen absorbers, particle size modifiers, antioxidants, and oxygen scavengers can be added in the preparation of the copolymer latex by polymerization.

There is no particular restriction on how to add the mixture of the constituent monomers. For example, the mixture of the constituent monomers may be added in one portion or in portions successively to a polymerization reactor. Alternatively, after a portion of the monomer mixture is added to a polymerization reactor, the remainder is added in divided portions successively to the polymerization reactor.

The emulsion polymerization is carried out at an appropriate temperature, typically from 10 to 90° C. and preferably from 25 to 75° C. The polymerization is stopped when the polymerization conversion reaches a predetermined level, preferably at least 90% and more preferably at least 93%. Unreacted monomers are removed, and the solids content and pH of the polymerization product are adjusted to desired levels.

2. Latex Composition for Dip Forming

The present invention also provides a latex composition for dip forming comprising the carboxylic acid-modified nitrile copolymer latex. Specifically, the latex composition of the present invention comprises the carboxylic acid-modified nitrile copolymer latex and one or more additives selected from the group consisting of ionic cross-linking agent, pigments, fillers, thickeners and pH-adjusting agents.

These additives may be those that are commonly used in the art. For example, the ionic cross-linking agent may be one that causes no allergic reactions. The pigment may be titanium oxide. The filler may be silica. The pH-adjusting agent may be ammonium or an alkali hydroxide.

Taking into consideration desired physical properties of a final dip-formed article (e.g. a glove), the copolymer latex is present in an amount of 80 to 99% by weight, preferably 85 to 98% by weight and most preferably 88 to 97% by weight, based on the total weight of the latex composition.

The solids content of the latex composition is preferably from 10 to 40% by weight, more preferably from 15 to 35% by weight, and most preferably from 18 to 33% by weight.

The pH of the latex composition is preferably from 8.0 to 12, more preferably from 9 to 11, and most preferably from 9.3 to 10.5.

3. Dip-Formed Article

The present invention also provides an article produced from the latex composition by dip forming. The dip-formed article of the present invention may be produced by any known dip forming process. Examples of such dip forming processes include direct dipping, anode coagulation dipping and Teague's coagulation dipping processes. Anode coagulation dipping is preferred because the dip-formed article can be produced with uniform thickness in an easy manner.

First, a hand-shaped dip forming mold is immersed in a coagulant solution to adhere the coagulant to the surface of the mold. Examples of coagulants suitable for use in the present invention include: metal halides, such as barium chloride, calcium chloride, magnesium chloride, zinc chloride and aluminum chloride; nitrates, such as barium nitrate, calcium nitrate and zinc nitrate; acetates, such as barium acetate, calcium acetate and zinc acetate; and sulfates, such as calcium sulfate, magnesium sulfate and aluminum sulfate. Of these, calcium chloride and calcium nitrate are preferred. The coagulant solution is prepared by dissolving the coagulant in water, alcohol or a mixture thereof. The concentration of the coagulant in the coagulant solution is typically from 5 to 75% by weight, preferably from 15 to 55% by weight, and most preferably from 18 to 40% by weight.

Then, the mold, to which the coagulant is adhered, is dipped in the latex composition of the present invention. The mold is taken out of the latex composition and is heated to crosslink the carboxylic acid-modified nitrile copolymer latex. The heating evaporates the water and cures the copolymer latex by crosslinking. Finally, the dip-formed layer (i.e., a glove) is peeled from the mold.

No particular limitation is imposed on the kind of latex articles that can be produced from the latex composition of the present invention by dip forming. Specific examples of such latex articles include industrial articles, such as surgical gloves, medical examination gloves, condoms and catheters, and health care articles, such as household gloves.

Hereinafter, the present invention will be explained in more detail with reference to the following examples. However, these examples are not intended to limit the scope of the invention.

EXAMPLES

Example 1

21 Parts by weight of acrylonitrile, 74 parts by weight of 1,3-butadiene, 5 parts by weight of methacrylic acid, 0.5 parts by weight of tert-dodecyl mercaptan, 2.3 parts by weight of sodium dodecylbenzene sulfonate, 140 parts by weight of water, 1 part by weight of glycidyl methacrylate and 0.3 parts by weight of potassium persulfate were heated to 40° C. in a reactor to initiate the polymerization of the monomers. When the polymerization conversion reached 65%, the temperature was raised to 70° C. to continue the polymerization. When the polymerization conversion reached 94%, 0.3 parts by weight of ammonium hydroxide was added to the reaction mixture to stop the polymerization. After stripping was performed to remove unreacted monomers, aqueous ammonia, an antioxidant and a defoaming agent were added to obtain a carboxylic acid-modified nitrile copolymer latex. The copolymer latex was found to have a solids content of 44.5% and a pH of 8.0.

Then, 0.03 parts by weight of potassium hydroxide and 0.7 parts by weight of titanium oxide were dispersed in 5 parts by weight of double-distilled water. 5.73 Parts by weight of the dispersion was mixed with 333 parts by weight of the copolymer latex (solids content=100 parts by weight), and then double-distilled water was added thereto to prepare a latex composition for dip forming (solids content=30%).

22 Parts by weight of calcium nitrate, 69.5 parts by weight of methanol, 8 parts by weight of calcium carbonate and 0.5 parts by weight of a wetting agent (Teric 320, Huntsman Corporation, Australia) were mixed together to prepare a coagulant solution. A hand-shaped ceramic mold was immersed in the coagulant solution for 1 min, taken out of the coagulant solution, and dried at 70° C. for 3 min to apply the coagulant to the mold. Then, the mold was immersed in the latex composition for 1 min, taken out of the latex composition, dried at 70° C. for 1 min, and dipped in water (e.g., hot water) for 3 min ('leaching'). The mold was dried at 70° C. for 3 min and was heated at 125° C. for 20 min to crosslink the copolymer latex. The dip-formed layer in the form of a glove was peeled from the hand-shaped mold by hand. The physical properties of the dip-formed article were measured. The results are shown in Table 1.

Example 2

A dip-formed article in the form of a glove was produced in the same manner as in Example 1, except that glycidyl methacrylate was used in an amount of 2 parts by weight. The physical properties of the dip-formed article were measured. The results are shown in Table 1.

Example 3

A dip-formed article in the form of a glove was produced in the same manner as in Example 1, except that allyl glycidyl ether was used instead of glycidyl methacrylate. The physical properties of the dip-formed article were measured. The results are shown in Table 1.

Example 4

A dip-formed article in the form of a glove was produced in the same manner as in Example 2, except that allyl glycidyl ether was used instead of glycidyl methacrylate. The physical properties of the dip-formed article were measured. The results are shown in Table 1.

Example 5

A dip-formed article in the form of a glove was produced in the same manner as in Example 1, except that diethylene glycol dimethacrylate was used instead of glycidyl methacrylate. The physical properties of the dip-formed article were measured. The results are shown in Table 1.

Example 6

A dip-formed article in the form of a glove was produced in the same manner as in Example 2, except that diethylene glycol dimethacrylate was used instead of glycidyl methacrylate. The physical properties of the dip-formed article were measured. The results are shown in Table 1.

Example 7

A dip-formed article in the form of a glove was produced in the same manner as in Example 1, except that 3,4-epoxycyclohexylmethyl(meth)acrylate was used in stead of glycidyl methacrylate. The physical properties of the dip-formed article were measured. The results are shown in Table 1.

Example 8

A dip-formed article in the form of a glove was produced in the same manner as in Example 2, except that 3,4-epoxycyclohexylmethyl(meth)acrylate was used instead of glycidyl methacrylate. The physical properties of the dip-formed article were measured. The results are shown in Table 1.

Example 9

A dip-formed article in the form of a glove was produced in the same manner as in Example 1, except that 1,6-hexanediol dimethacrylate was used instead of glycidyl methacrylate. The physical properties of the dip-formed article were measured. The results are shown in Table 1.

Example 10

A dip-formed article in the form of a glove was produced in the same manner as in Example 2, except that 1,6-hexanediol dimethacrylate was used instead of glycidyl methacrylate. The physical properties of the dip-formed article were measured. The results are shown in Table 1.

Comparative Example 1

A dip-formed article in the form of a glove was produced in the same manner as in Example 1, except that glycidyl methacrylate was not used. The physical properties of the dip-formed article were measured. The results are shown in Table 1.

The physical properties of the dip-formed articles produced in Examples 1-10 and Comparative Example 1 were evaluated in accordance with the following procedures.

* Tensile strength, elongation and modulus at 300%: Dumbbell-shaped specimens were prepared using the dip-formed articles of Examples 1-10 and Comparative Example 1 in accordance with the method of ASTM D-412. Subsequently, each of the specimens was elongated at a rate of 500 mm/min and was measured for stress at an elongation of 300%, tensile strength at break and elongation at break.
* Tensile strength retention: A standard zone (length=20 mm) of each of the dumbbell-shaped specimens was elongated at a rate of 500 mm/min from both ends. The elongation was stopped until the length of the standard zone reached 40 mm. The stress was measured ('M100 (0)'). After the specimen was allowed to stand for 6 minutes, the stress was measured ('M100 (6)'). The ratio of ('M100 (6)') to ('M100 (0)') was defined as the stress retention of the specimen. The specimen was judged to be 'fit' when the stress retention of the specimen was 50% or above.
* Oil resistance: Circular specimens (diameter=25 mm) were prepared using the dip-formed articles. Each of the specimens was dipped in cyclohexanone for 30 min. The diameter of the swollen specimen was measured. The diameter of the specimen after the dipping was divided by the diameter of the specimen before the dipping. The obtained value was defined as the oil resistance of the specimen. The lower the value, the better the oil resistance.

TABLE 1

|  | Tensile strength (MPa) | Elongation (%) | Modulus at 300% (MPa) | Tensile strength retention (%) | Oil resistance |
|---|---|---|---|---|---|
| Example 1 | 21.3 | 630 | 3.51 | 55 | 1.5 |
| Example 2 | 23.1 | 610 | 3.72 | 57 | 1.3 |
| Example 3 | 19.5 | 641 | 3.20 | 52 | 1.7 |
| Example 4 | 22.3 | 619 | 3.53 | 53 | 1.5 |
| Example 5 | 17.4 | 657 | 3.66 | 51 | 1.8 |
| Example 6 | 20.6 | 632 | 4.22 | 53 | 1.6 |
| Example 7 | 17.0 | 643 | 3.47 | 50 | 1.7 |
| Example 8 | 20.1 | 625 | 4.32 | 54 | 1.4 |
| Example 9 | 19.8 | 639 | 3.55 | 53 | 1.6 |
| Example 10 | 22.9 | 620 | 4.01 | 56 | 1.4 |
| Comparative Example 1 | 10.4 | 720 | 2.01 | 39 | 2.5 |

As can be seen from the results in Table 1, the dip-formed articles of Examples 1-10 in the form of gloves showed excellent characteristics in terms of tensile strength, elongation and oil resistance, whereas the dip-formed article of Comparative Example 1 had a very low tensile strength and a very low stress retention, which indicates poor fit of the glove. These results lead to the conclusion that the use of the unsaturated monomer having at least one crosslinkable functional group in the preparation of the carboxylic acid-modified nitrile copolymer latex by polymerization contributes to improvements in tensile strength, elongation and oil resistance while eliminating the need to use sulfur and a vulcanization accelerator.

As is apparent from the foregoing, the carboxylic acid-modified nitrile copolymer latex of the present invention comprises a carboxylic acid-modified nitrile copolymer of an unsaturated monomer having at least one crosslinkable functional group selected from vinyl and epoxy groups. The use of the carboxylic acid-modified nitrile copolymer latex according to the present invention enables the production of a molded article that does not undergo long stirring and maturation, causes no allergic reactions due to the absence of sulfur and a vulcanization accelerator, has good oil resistance and high mechanical strength, and produces a soft feeling.

What is claimed is:

1. A carboxylic acid-modified nitrile copolymer latex comprising a carboxylic acid-modified nitrile copolymer prepared from a conjugated diene monomer, an ethylenically unsaturated nitrile monomer, an ethylenically unsaturated acid monomer, and an unsaturated monomer having at least one crosslinkable functional group,
    wherein the conjugated diene monomer, the ethylenically unsaturated nitrile monomer, the ethylenically unsaturated acid monomer and the unsaturated monomer having at least one crosslinkable functional group are used in amounts of 40 to 90% by weight, 10 to 50% by weight, 0.1 to 10% by weight and 0.1 to 1% by weight, respectively,
    wherein the unsaturated monomer is selected from the group consisting of glycidyl (meth)acrylate, α-methylglycidyl (meth)acrylate, allyl glycidyl ether, oxocyclohexyl (meth)acrylate, 3,4-epoxycyclohexylmethyl (meth)acrylate, ethyleneglycol dimethacrylate, diethyleneglycol dimethacrylate, triethyleneglycol dimethacrylate, 1,3-butanediol dimethacrylate, 1,6-hexanediol dimethacrylate, 2,5-hexanediol dimethacrylate, 2,4-pentanediol diacrylate, 2,4-pentanediol dimethacrylate, dipropyleneglycol diacrylate, trimethylolpropane triacrylate, trimethylolpropane trimethacrylate, neopentylglycol diacrylate, neopentylglycol dimethacrylate, and mixtures thereof.

2. The carboxylic acid-modified nitrile copolymer latex of claim 1, wherein the conjugated diene monomer is selected from the group consisting of 1,3-butadiene, 2,3-dimethyl-1,3-butadiene, 2-ethyl-1,3-butadiene, 1,3-pentadiene, isoprene, and mixtures thereof.

3. The carboxylic acid-modified nitrile copolymer latex of claim 1, wherein the ethylenically unsaturated nitrile monomer is selected from the group consisting of acrylonitrile, methacrylonitrile, fumaronitrile, α-chloronitrile, α-cyanoethylacrylonitrile, and mixtures thereof.

4. The carboxylic acid-modified nitrile copolymer latex of claim 1, wherein the ethylenically unsaturated acid monomer has at least one acid group selected from the group consisting of carboxyl, sulfonic acid and acid anhydride groups.

5. The carboxylic acid-modified nitrile copolymer latex of claim 4, wherein the ethylenically unsaturated acid monomer is selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate, and mono-2-hydroxypropyl maleate.

6. The carboxylic acid-modified nitrile copolymer latex of claim 1, wherein an ethylenically unsaturated monomer copolymerizable with the ethylenically unsaturated nitrile monomer and the ethylenically unsaturated acid monomer is further added in an amount not larger than 20% by weight, based on the weight of all constituent monomers of the carboxylic acid-modified nitrile copolymer, in the preparation of the carboxylic acid-modified nitrile copolymer.

7. The carboxylic acid-modified nitrile copolymer latex of claim 6, wherein the copolymerizable ethylenically unsaturated monomer is selected from the group consisting of vinyl aromatic monomers, fluoroalkyl vinyl ethers, ethylenically unsaturated amide monomers, non-conjugated diene monomers, ethylenically unsaturated carboxylic acid ester monomers, and mixtures thereof.

8. The carboxylic acid-modified nitrile copolymer latex of claim 1, wherein the copolymer latex comprises 0.3 to 10 parts by weight of an emulsifier, 0.01 to 2 parts by weight of a polymerization initiator and 0.1 to 0.9 parts by weight of a molecular weight modifier, based on 100 parts by weight, of all constituent monomers of the carboxylic acid-modified nitrile copolymer.

9. A latex composition for dip forming, comprising the carboxylic acid-modified nitrile copolymer latex of claim 1, wherein the latex composition does not contain sulfur and a vulcanization accelerator.

10. The latex composition of claim 9, wherein the carboxylic acid-modified nitrile copolymer latex is present in an amount of 80 to 99% by weight, based on the total weight of the latex composition.

11. The latex composition of claim 9, wherein the latex composition comprises one or more additives selected from the group consisting of pigments, ionic cross-linking agents, fillers, thickeners and pH-adjusting agents.

12. The latex composition of claim 11, wherein the ionic cross-linking agent is zinc oxide.

13. An article produced from the latex composition of claim 9 by dip forming.

* * * * *